(12) United States Patent
Ding et al.

(10) Patent No.: US 10,423,728 B2
(45) Date of Patent: Sep. 24, 2019

(54) CLUSTERING METHOD FOR A POINT OF INTEREST AND RELATED APPARATUS

(71) Applicant: Huawei Technologies Co., Ltd., Shenzhen (CN)

(72) Inventors: Qiang Ding, Beijing (CN); Shaoxu Song, Beijing (CN); Yangzhen Ou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 465 days.

(21) Appl. No.: 15/148,365

(22) Filed: May 6, 2016

(65) Prior Publication Data

US 2016/0253407 A1 Sep. 1, 2016

Related U.S. Application Data

(63) Continuation of application No. PCT/CN2014/088443, filed on Oct. 13, 2014.

(30) Foreign Application Priority Data

Nov. 7, 2013 (CN) .......................... 2013 1 0552636

(51) Int. Cl.
*G06K 9/46* (2006.01)
*G06F 17/30* (2006.01)
(Continued)

(52) U.S. Cl.
CPC ... *G06F 17/30601* (2013.01); *G01C 21/3679* (2013.01); *G06F 17/30241* (2013.01);
(Continued)

(58) Field of Classification Search
CPC ......... H04W 4/02; H04W 64/00; H04W 4/04; H04W 40/20; H04W 4/023;
(Continued)

(56) References Cited

U.S. PATENT DOCUMENTS 5,844,522 A * 12/1998 Sheffer .................... G01S 5/04
342/457
8,301,371 B2 10/2012 Sheha et al.
(Continued)

FOREIGN PATENT DOCUMENTS

CN 101742545 A 6/2010
CN 102595323 A 7/2012
(Continued)

OTHER PUBLICATIONS

Ashbrook, D. et al.: "Learning Significant Locations and Predicting User Movement With GPS," Sixth International Symposium on Wearable Computers, Oct. 2002, pp. 101-108.
(Continued)

*Primary Examiner* — Angelica Ruiz
(74) *Attorney, Agent, or Firm* — Slater Matsil, LLP

(57) ABSTRACT

A clustering method for a point of interest and a related apparatus are provided. The clustering method for a point of interest includes: acquiring a locating point set of a user within a preset period; generating a stay point set according to the locating point set, where each stay point in the stay point set represents one hot area; calculating a confidence level of each stay point in the stay point set; obtaining a trusted stay point from the stay point set by means of screening according to the confidence level of each stay point in the stay point set; and clustering density-connected trusted stay points to form a point of interest. By using technical solutions provided in the present disclosure, reliability and reference value of a POI can be effectively improved.

20 Claims, 5 Drawing Sheets

(51) Int. Cl.
*G01C 21/36* (2006.01)
*H04W 4/02* (2018.01)
*H04W 4/029* (2018.01)

(52) U.S. Cl.
CPC ............... *G06K 9/46* (2013.01); *H04W 4/023* (2013.01); *H04W 4/025* (2013.01); *H04W 4/029* (2018.02)

(58) Field of Classification Search
CPC ............... G06F 17/30241; G06F 19/24; G06F 17/30312; G06F 17/30539
See application file for complete search history.

(56) References Cited

U.S. PATENT DOCUMENTS

| | | | |
|---|---|---|---|
| 8,335,990 | B2 | 12/2012 | Arrasvuori |
| 8,339,399 | B2 | 12/2012 | Snow |
| 8,358,224 | B2 | 1/2013 | Seder et al. |
| 2001/0022558 | A1* | 9/2001 | Karr, Jr. ............... G01S 1/026 342/450 |
| 2006/0181505 | A1* | 8/2006 | Dort ............... G06F 3/03545 345/156 |
| 2007/0219706 | A1 | 9/2007 | Sheynblat |
| 2008/0186234 | A1 | 8/2008 | Alles et al. |
| 2008/0268816 | A1* | 10/2008 | Wormald ............... H04L 67/24 455/412.2 |
| 2010/0069035 | A1* | 3/2010 | Johnson ............... H04W 4/02 455/404.1 |
| 2010/0189312 | A1* | 7/2010 | Nielsen ............... G01C 15/02 382/113 |
| 2011/0047509 | A1 | 2/2011 | Arrasvuori |
| 2011/0151898 | A1 | 6/2011 | Chandra et al. |
| 2012/0047152 | A1* | 2/2012 | Purdy ............... H04W 4/029 707/754 |
| 2012/0203732 | A1 | 8/2012 | Oono |
| 2012/0239607 | A1 | 9/2012 | Rao et al. |
| 2013/0262479 | A1 | 10/2013 | Liang et al. |
| 2013/0273937 | A1 | 10/2013 | Nakahara |
| 2013/0339498 | A1* | 12/2013 | Johnson ............... H04W 4/02 709/221 |

FOREIGN PATENT DOCUMENTS

| | | |
|---|---|---|
| CN | 102682041 A | 9/2012 |
| CN | 103218442 A | 7/2013 |
| JP | 2009116541 A | 5/2009 |
| JP | 2011171876 A | 9/2011 |
| WO | 2007115240 A2 | 10/2007 |
| WO | 2008121872 A1 | 10/2008 |
| WO | 2011046113 A1 | 4/2011 |
| WO | 2012080787 A1 | 6/2012 |
| WO | 2012096175 A1 | 7/2012 |
| WO | 2013060925 A1 | 5/2013 |

OTHER PUBLICATIONS

Khetarpaul, S. et al.: "Mining GPS Data to Determine Interesting Locations," Mar. 28, 2011, pp. 1-6.
Minh, T., et al.; "Contextual Conditional Models for Smartphone-Based Human Mobility Prediction," Sep. 2012, pp. 1-10.
Zheng, Y. et al.: "Mining Interesting Locations and Travel Sequences From GPS Trajectories," Apr. 20-24, 2009, pp. 1-10, Madrid, Spain.
Gambs, S. et al.: "Next Place Prediction Using Mobility Markov Chains," Apr. 10, 2012, pp. 1-6, Bern, Switzerland.

* cited by examiner

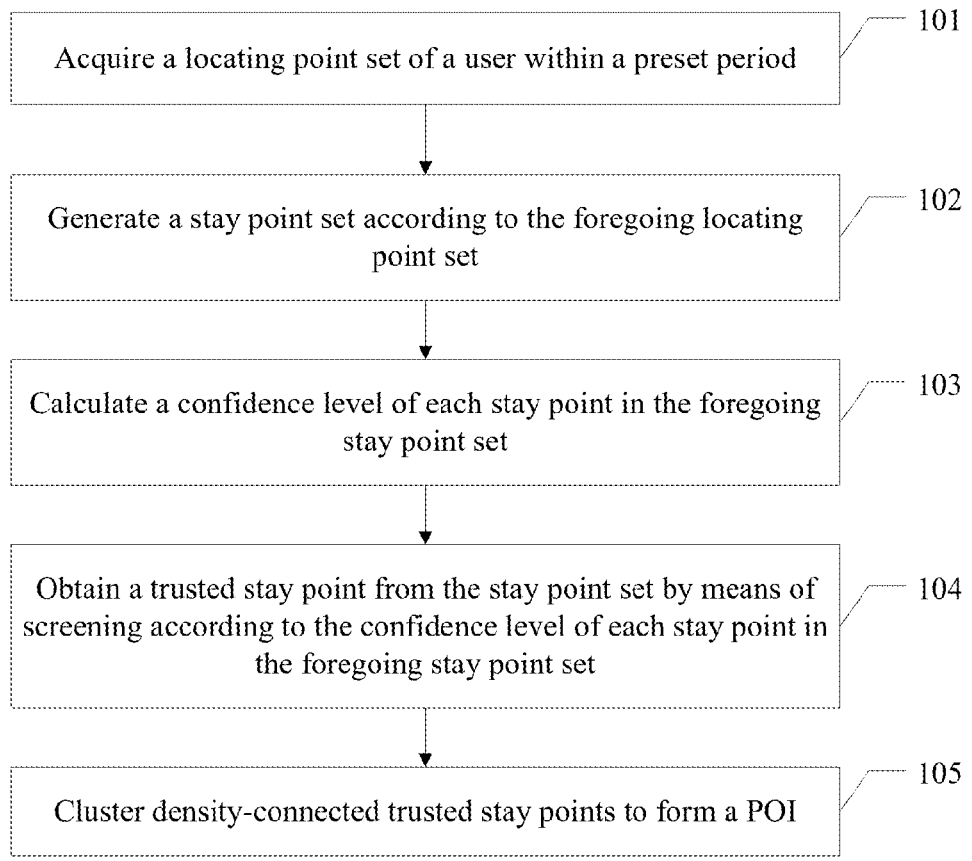
FIG. 1
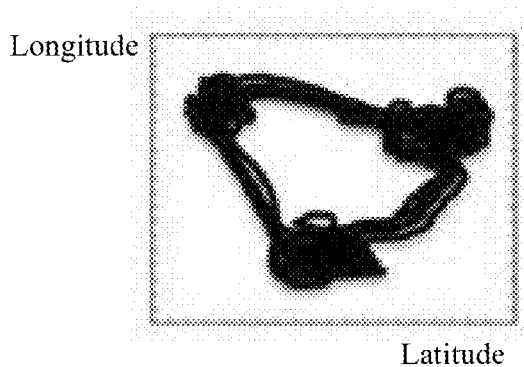
FIG. 2-a

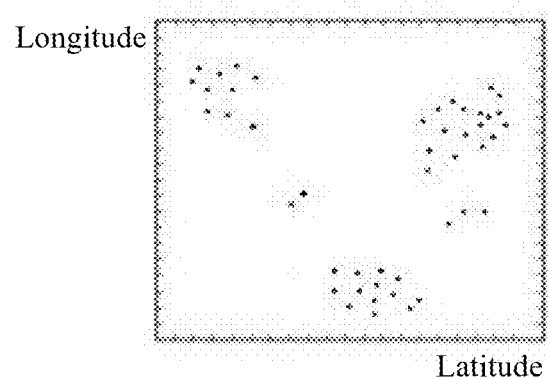
FIG. 2-b
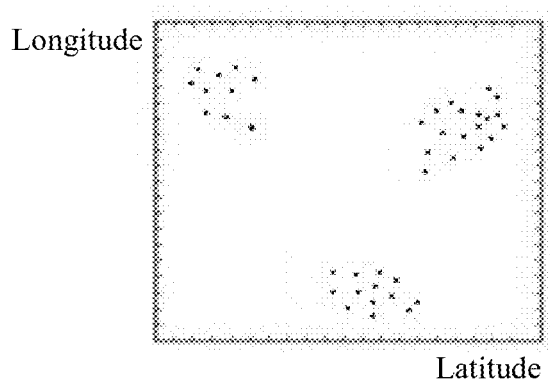
FIG. 2-c
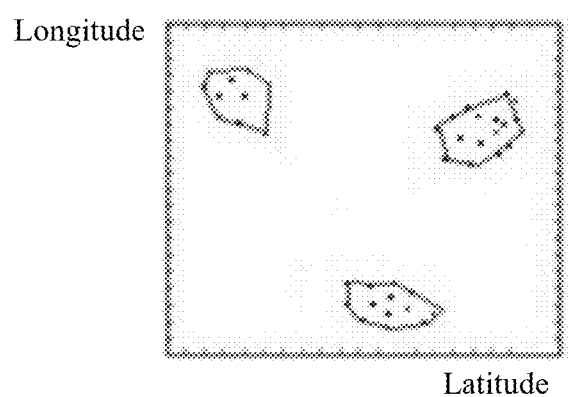
FIG. 2-d

CLUSTERING METHOD FOR A POINT OF INTEREST AND RELATED APPARATUS

This application is a continuation of International Application No. PCT/CN2014/088443, filed on Oct. 13, 2014, which claims priority to Chinese Patent Application No. 201310552636.2, filed on Nov. 7, 2013, both of which are hereby incorporated by reference in their entireties.

TECHNICAL FIELD

The present disclosure relates to the field of geographic information processing technologies, and in particular, to a clustering method for a point of interest and a related apparatus.

BACKGROUND

A point of interest (POI) refers to a location area in which a user frequently stays for a long time, for example an area that is of great importance to the user, such as a home, an office, or a frequently-visited supermarket.

Track information of daily activities of the user may be acquired by using a locating function, such as a Wi-Fi network, a Global Positioning System (GPS), and a base station identity (ID) of a terminal such as a mobile phone. The track information includes a large quantity of locating coordinate points with a locating deviation. The study on how to extract a POI of the user from the track information is of great value to context awareness and a location based service (LBS), and is also a research focus in the academia.

Currently, there is a method for exploring a POI based on multiple GPS track information of a user, and a main idea of the method is: first modeling multiple historical location data of the user by using a tree-like hierarchical pattern, and then proposing, based on the tree-like hierarchical pattern, an inference model that performs searching based on a hypertext subject, and establishing a link from a user to a location for a single visit of an individual.

However, in the foregoing method, a stay point of the user is extracted by using spatial and temporal dimensions. The stay point can represent only a single visit of the user, but cannot represent a POI place that is of great importance to the user. In addition, when a POI is being explored, only historical location data of the user is referred to, and therefore reliability and reference value of the explored POI is low.

SUMMARY

Embodiments of the present disclosure provide a clustering method for a point of interest and a related apparatus, which are used to improve reliability and reference value of a POI.

A first aspect of the present disclosure provides a clustering method for a point of interest. The method includes acquiring a locating point set of a user within a preset period. The method also includes generating a stay point set according to the foregoing locating point set. Each stay point in the foregoing stay point set represents one hot area, and the foregoing hot area meets the following conditions: a distance between geographic locations of any two locating points in the foregoing hot area is less than a higher locating precision in locating precisions of the foregoing two locating points, and a maximum value of a time interval between locating points in the foregoing hot area is greater than a preset time threshold. The method also includes calculating a confidence level of each stay point in the foregoing stay point set, where a lower average speed corresponding to movement states of all locating points in a hot area represented by a stay point indicates a higher confidence level of the stay point. The method also includes obtaining a trusted stay point from the foregoing stay point set by means of screening according to the confidence level of each stay point in the foregoing stay point set, where a confidence level of the foregoing trusted stay point is greater than a preset confidence level threshold. The method also includes clustering density-connected trusted stay points to form a point of interest, where the foregoing density-connected indicates that ranges of hot areas represented by two trusted stay points are directly connected or indirectly connected each other.

Based on the first aspect of the present disclosure, in a first possible implementation manner, the foregoing generating a stay point set according to the foregoing locating point set includes: determining a hot area that meets the foregoing conditions; and determining a geometric center point of the foregoing hot area as a stay point that represents the foregoing hot area.

Based on the first aspect of the present disclosure or the first possible implementation manner of the first aspect of the present disclosure, in a second possible implementation manner, the foregoing calculating a confidence level of each stay point in the foregoing stay point set includes: acquiring movement states of all locating points included in a hot area represented by each stay point; and calculating the confidence level of each stay point in the foregoing stay point set by using a formula $$Conf_i = \left( \sum_{k=1}^{n} W_k \cdot n_k \right) \Big/ \sum_{k=1}^{n} n_k$$

and according to the movement states of all locating points included in the hot area represented by each stay point, where $Conf_i$ represents a confidence level of a stay point i, n represents n possible movement states, $W_k$ represents a confidence level weight of the kth movement state, and $n_k$ represents a quantity of locating points that are in a hot area represented by the stay point i and whose movement states are the $k^{th}$ movement state, where each movement state is corresponding to a confidence level weight, and a lower movement speed corresponding to a movement state indicates a larger confidence level weight of the movement state.

Based on the second possible implementation manner of the first aspect of the present disclosure, in a third possible implementation manner, the foregoing acquiring movement states of all locating points included in a hot area represented by each residence point is as follows: acquiring the movement states of all locating points in the foregoing locating point set according to sensor data on a terminal of the user or a change of signal strength and a change of a signal quantity of a Wi-Fi network.

Based on the first aspect, or the first possible implementation manner of the first aspect of the present disclosure, or the second possible implementation manner of the first aspect of the present disclosure, or the third possible implementation manner of the first aspect of the present disclosure, in a fourth possible implementation manner, the foregoing clustering density-connected trusted stay points to form a point of interest includes: determining a closed area that is formed by sequentially connecting all leaf stay points among all density-connected trusted stay points as an area of a point of interest, where a sum of confidence levels of all stay points within a preset radius coverage range whose center is a leaf stay point is not greater than a preset threshold.

A second aspect of the present disclosure provides a clustering apparatus for a point of interest. The apparatus includes: an acquiring unit, configured to acquire a locating point set of a user within a preset period. The apparatus also includes a stay point generating unit, configured to generate a stay point set according to the locating point set acquired by the foregoing acquiring unit. Each stay point in the foregoing stay point set represents one hot area, and the foregoing hot area meets the following conditions: a distance between geographic locations of any two locating points in the foregoing hot area is less than a higher locating precision in locating precisions of the foregoing two locating points, and a maximum value of a time interval between locating points in the foregoing hot area is greater than a preset time threshold. The apparatus also includes a calculating unit, configured to calculate a confidence level of each stay point in the foregoing stay point set, where a lower average speed corresponding to movement states of all locating points in a hot area represented by a stay point indicates a higher confidence level of the stay point. The apparatus also includes a filtering unit, configured to obtain a trusted stay point from the foregoing stay point set by means of screening according to the confidence level that is of each stay point in the foregoing stay point set and is calculated by the foregoing calculating unit, where a confidence level of the foregoing trusted stay point is greater than a preset confidence level threshold. The apparatus also includes a clustering unit, configured to cluster density-connected trusted stay points to form a point of interest, where the foregoing "density-connected" indicates that ranges of hot areas represented by two trusted stay points are directly connected or indirectly connected.

Based on the second aspect of the present disclosure, in a first possible implementation manner, the foregoing stay point generating unit includes: a first determining unit, configured to determine a hot area that meets the foregoing conditions; and a second determining unit, configured to determine a geometric center point of the foregoing hot area as a stay point that represents the foregoing hot area.

Based on the second aspect of the present disclosure or the first possible implementation manner of the second aspect of the present disclosure, in a second possible implementation manner, the foregoing calculating unit includes: an acquiring subunit, configured to acquire movement states of all locating points included in a hot area represented by each stay point; and a calculating subunit, configured to calculate the confidence level of each stay point in the foregoing stay point set by using a formula $$Conf_i = \left(\sum_{k=1}^{n} W_k \cdot n_k\right) / \sum_{k=1}^{n} n_k$$

and according to the movement states that are of all locating points included in the hot area represented by each stay point and are acquired by the foregoing acquiring subunit, where $W_k$ represents a confidence level of a stay point i, n represents n possible movement states, represents a confidence level weight of the $k^{th}$ movement state, and $n_k$ represents a quantity of locating points that are in a hot area represented by the stay point i and whose movement states are the $k^{th}$ movement state, where each movement state is corresponding to a confidence level weight, and a lower movement speed corresponding to a movement state indicates a larger confidence level weight of the movement state.

Based on the second possible implementation manner of the second aspect of the present disclosure, in a third possible implementation manner, the foregoing acquiring subunit is configured to acquire the movement states of all locating points included in the hot area represented by each residence point according to sensor data on a terminal of the user or a change of signal strength and a change of a signal quantity of a Wi-Fi network.

Based on the second aspect of the present disclosure, or the first possible implementation manner of the second aspect of the present disclosure, or the second possible implementation manner of the second aspect of the present disclosure, or the third possible implementation manner of the second aspect of the present disclosure, in a fourth possible implementation manner, the clustering unit is configured to cluster all density-connected trusted stay points to form a point of interest, and determine a closed area that is formed by sequentially connecting all leaf stay points among all density-connected trusted stay points as an area of a point of interest, where a sum of confidence levels of all stay points within a preset radius coverage range whose center is a leaf stay point is not greater than a preset threshold.

It can be learned from the foregoing technical solutions that the embodiments of the present disclosure have the following advantages.

It can be learned from the foregoing that, in the embodiments of the present disclosure, one stay point is formed by multiple locating points according to a locating precision and a time threshold, and most layover points, locating jump points, and pass-through points can be filtered out under the constraint of the locating precision and the time threshold. In addition, a confidence level of a stay point is calculated with reference to movement states of locating points of the stay point, and a stay point whose confidence level is relatively low is screened out according to the confidence level of the stay point, so that some on-the-way noise stay points (such as pseudo stay points generated at the time of staying in a traffic-jammed section, waiting for a traffic light, and slowly walking) can further be filtered out. Therefore, a point of interest that is finally formed by clustering density-connected trusted stay points has higher reliability and higher reference value.

BRIEF DESCRIPTION OF THE DRAWINGS

For a more complete understanding of the present invention, and the advantages thereof, reference is now made to the following descriptions taken in conjunction with the accompanying drawings.

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

FIG. 1 is a schematic flowchart of an embodiment of a clustering method for a point of interest according to the present disclosure;

FIG. 2-a is a schematic diagram of a track of a locating point set in an application scenario according to the present disclosure;

FIG. 2-b is a schematic diagram of a stay point set formed in an application scenario according to the present disclosure;

FIG. 2-c is a schematic diagram of a trusted stay point set obtained by means of screening in an application scenario according to the present disclosure;

FIG. 2-d is a schematic diagram of a POI obtained by means of clustering in an application scenario according to the present disclosure;

DETAILED DESCRIPTION OF ILLUSTRATIVE EMBODIMENTS

Figure 3:
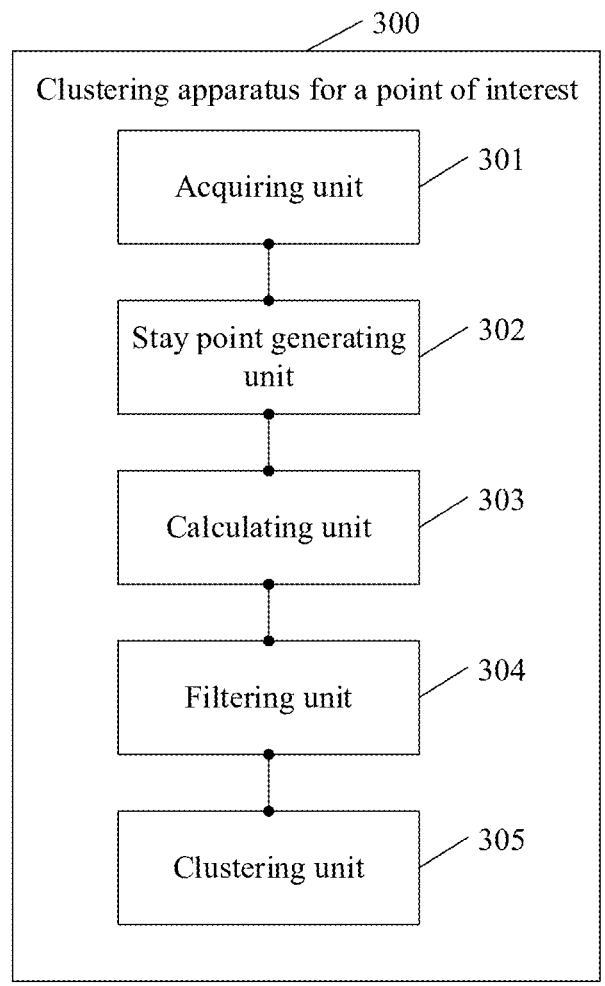
FIG. 3 is a schematic structural diagram of an embodiment of a clustering apparatus for a point of interest according to the present disclosure.

Embodiments of the present disclosure provide a clustering method for a point of interest and a related apparatus.

To make the disclosure objectives, features, and advantages of the present disclosure clearer and more comprehensible, the following clearly describes the technical solutions in the embodiments of the present disclosure with reference to the accompanying drawings in the embodiments of the present disclosure. The embodiments described are merely a part rather than all of the embodiments of the present disclosure. All other embodiments obtained by a person of ordinary skill in the art based on the embodiments of the present disclosure without creative efforts shall fall within the protection scope of the present disclosure.

The following describes a clustering method for a point of interest provided in an embodiment of the present disclosure. Referring to FIG. 1, the clustering method for a point of interest in this embodiment of the present disclosure includes the following steps.

101. Acquire a locating point set of a user within a preset period.

The locating point set in this embodiment of the present disclosure includes one or more locating points, and the locating point is used to indicate location information of the user.

Optionally, the locating point is a GPS location point represented by a longitude value and a latitude value, and a clustering apparatus for a point of interest acquires the locating point set of the user within a preset period from GPS location data of the user.

102. Generate a stay point set according to the foregoing locating point set.

Each stay point in the foregoing stay point set represents one hot area, where the foregoing hot area meets the following conditions: a distance between geographic locations of any two locating points in the foregoing hot area is less than a higher locating precision in locating precisions of the foregoing two locating points, and a maximum value of a time interval between locating points in the foregoing hot area is greater than a preset time threshold.

For example, it is assumed that a locating point set $\{P_j, P_{j+1}, \ldots, P_{j+L}\}$ constitutes a hot area in which a stay point may be formed, and then the locating point set $\{P_j, P_{j+1}, \ldots, P_{j+L}\}$ needs to meet the following two conditions.

1. A distance between geographic locations of any two locating points in $\{P_j, P_{j+1}, \ldots, P_{j+L}\}$ is less than a spatial threshold $D_{th}$, where $D_{th}$ is not a fixed value, and it varies as related locating points change, and is a maximum value in locating precisions of two locating points, that is, $D_{th}(P_n, P_m)=\max(\text{Radius}(P_n),\text{Radius}(P_m))$. For example, it is assumed that a locating precision of a locating point $P_1$ is 5 meters, a locating precision of a locating point) $P_2$ is 10 meters, and then for the locating point $P_1$ and the locating point $P_2$, $D_{th}(P_1,P_2)$ is equal to a higher locating precision in locating precisions of the locating point $P_1$ and the locating point $P_2$, that is, $D_{th}(P_1,P_2)$ is equal to 10 meters. If a locating precision of a locating point $P_3$ is 15 meters, for the locating point $P_1$ and the locating point $P_3$, $D_{th}(P_1, P_3)$ is equal to a higher locating precision in locating precisions of the locating point $P_1$ and the locating point $P_3$, that is, $D_{th}(P_1,P_2)$ is equal to 15 meters.

2. Because different locating points are obtained by means of measurement at different time points, a time interval exists between every two locating points. For example, it is assumed that the locating point $P_1$ is obtained by means of measurement at 10:00, the locating point $P_2$ is obtained by means of measurement at 10:03, and then a time interval between the locating point $P_1$ and the locating point $P_2$ is three minutes. In this embodiment of the present disclosure, the $\{P_j, P_{j+1}, \ldots, P_{j+L}\}$ further needs to meet the following condition: a maximum value of a time interval between locating points in the $\{P_j, P_{j+1}, \ldots, P_{j+L}\}$ is greater than a preset time threshold $T_{th}$ (for example, a value of $T_{th}$ may be 5 minutes, 7 minutes, or 10 minutes), that is, in the $\{P_j, P_{j+1}, \ldots, P_{j+L}\}$, a time interval between a locating point that is firstly obtained by means of measurement and a locating point that is lastly obtained by means of measurement is greater than $T_{th}$, where $T_{th}$ may be set according to an actual requirement, which is not limited herein.

Optionally, after a hot area that meets the foregoing conditions is determined, a geometric center point of the foregoing hot area is determined as a stay point that represents the foregoing hot area, where the stay point may represent all locating points in the hot area. Certainly, another manner may also be used to determine a stay point corresponding to a hot area. For example, a center of gravity of a hot area is used as a stay point that represents the hot area, where the center of gravity of the hot area is related to a distribution of locating points within the hot area.

103. Calculate a confidence level of each stay point in the foregoing stay point set.

A lower average speed corresponding to movement states of all locating points in a hot area represented by a stay point indicates a higher confidence level of the stay point.

In an implementation manner, the clustering apparatus for a point of interest acquires movement states of all locating points included in a hot area represented by each stay point in the foregoing stay point set, and calculates the confidence level of each stay point in the foregoing stay point set according to the movement states of all locating points included in the hot area represented by each stay point in the foregoing stay point set and by using a formula $$Conf_i = \left(\sum_{k=1}^{n} W_k \cdot n_k\right) / \sum_{k=1}^{n} n_k,$$

where $Conf_i$ represents a confidence level of a stay point i, n represents n possible movement states, $W_k$ represents a confidence level weight of the $k^{th}$ movement state, and $n_k$ represents a quantity of locating points that are in a hot area represented by the stay point i and whose movement states are the $k^{th}$ movement state, where each movement state is corresponding to a confidence level weight, and a lower movement speed corresponding to a movement state indicates a larger confidence level weight of the movement state. For example, it is assumed that a possible movement state of the user is stationary, walking, or riding, and then for the three movement states, because movement speeds that are corresponding to the movement states and are in ascending order are sequentially as follows: stationary, walking, and riding, confidence level weights that are of the movement states and are in descending order are sequentially as follows: stationary, walking, and riding.

Optionally, the clustering apparatus for a point of interest acquires the movement states of all locating points in the foregoing locating point set according to sensor data (such as an acceleration and data acquired from a gyroscope) on a terminal (such as a mobile phone, a tablet, and a vehicle-mounted terminal) of the foregoing user or a change of signal strength and a change of a signal quantity of a Wi-Fi network; or the clustering apparatus for a point of interest may acquire the movement states of all locating points included in the hot area represented by each residence point from another locating device (such as a server), which is not limited herein.

104. Obtain a trusted stay point from the foregoing stay point set by means of screening according to the confidence level of each stay point in the foregoing stay point set.

The confidence level of the foregoing trusted stay point is greater than a preset confidence level threshold.

In this embodiment of the present disclosure, the clustering apparatus for a point of interest obtains the trusted stay point (that is, a stay point whose confidence level is greater than the preset confidence level threshold) from the foregoing stay point set by means of screening, and removes a stay point whose confidence level is not greater than the preset confidence level threshold.

105. Cluster density-connected trusted stay points to form a POI.

The foregoing "density-connected" indicates that ranges of hot areas represented by two trusted stay points are directly connected or indirectly connected each other. For example, it is assumed that a coverage range of a trusted stay point $P_1$ intersects with a coverage range of a trusted stay point $P_2$, and then ranges of hot areas represented by the trusted stay point $P_1$ and the trusted stay point $P_2$ are directly connected each other. In this case, the trusted stay point $P_1$ and the trusted stay point $P_2$ are density-connected. Alternatively, it is assumed that a coverage range of a trusted stay point $P_1$ intersects with a coverage range of a trusted stay point $P_3$, a coverage range of a trusted stay point $P_2$ intersects with a coverage range of a trusted stay point $P_4$, and the coverage range of the trusted stay point $P_3$ intersects with the coverage range of the trusted stay point $P_4$, and then ranges of hot areas represented by the trusted stay point $P_1$ and the trusted stay point $P_2$ are indirectly connected each other. In this case, the trusted stay point $P_1$ and the trusted stay point $P_2$ are also density-connected.

Optionally, if the trusted stay point $P_1$ (which may be a leaf stay point, or may be an inner stay point) is density-reachable from an inner stay point o, and the trusted stay point $P_2$ (which may be a leaf stay point, or may be an inner stay point) is density-reachable from the inner stay point o, the trusted stay point $P_1$ and the trusted stay point $P_2$ are density-connected. The following describes the "inner stay point", the "leaf stay point", and the "density-reachable".

Inner stay point: a sum of trusted levels of all stay points within preset radius coverage whose center is the stay point is greater than a preset threshold.

Leaf stay point: a sum of trusted levels of all stay points within preset radius coverage whose center is the stay point is not greater than a preset threshold.

Density-reachable: in a given series of trusted stay points $p_1, p_2, \ldots, p_n$, where $p_i$ (0<i<n) must be an inner stay point, $p_n$ may be a leaf stay point or an inner stay point, $P=p_i$, and $Q=p_n$, it is assumed that $p_i$ is directly density-reachable from $p_{i-1}$ (1<i<(n+1)), and then a stay point Q is density-reachable from an inner stay point P.

Directly density-reachable: if a trusted stay point P (which may be a leaf stay point, or may be an inner stay point) is located within radius coverage of a trusted stay point Q, and the trusted stay point Q is an inner stay point, the trusted stay point P is directly density-reachable from the trusted stay point Q.

Optionally, all density-connected trusted stay points are clustered to form a POI. In addition, a closed area that is formed by sequentially connecting all leaf stay points among all the density-connected trusted stay points as an area of the POI, or an area of the POI may be a minimum circular area or square area that includes all the density-connected trusted stay points, which is not limited herein.

It can be learned from the foregoing that, in this embodiment of the present disclosure, one stay point is formed by multiple locating points according to a locating precision and a time threshold, and most layover points, locating jump points, and pass-through points can be filtered out under the constraint of the locating precision and the time threshold. In addition, a confidence level of a stay point is calculated with reference to movement states of locating points of the stay point, and a stay point whose confidence level is relatively low is screened out according to the confidence level of the stay point, so that some on-the-way noise stay points (such as pseudo stay points generated at the time of staying in a traffic-jammed section, waiting for a traffic light, and slowly walking) can further be filtered out. Therefore, a point of interest that is finally formed by clustering density-connected trusted stay points has higher reliability and higher reference value.

For a better understanding of the technical solutions of the present disclosure, the following describes the clustering method for a point of interest in this embodiment of the present disclosure by using a specific application scenario.

It is assumed that a track of a locating point set of a user within a preset period is shown in FIG. 2-a.

Step 1: A clustering apparatus for a point of interest determines, from the locating point set that is shown in FIG. 2-a and by using a dynamic spatial threshold and time threshold, a hot area that meets the following two conditions: 1. a distance between geographic locations of any two locating points in the hot area is less than a higher locating precision in locating precisions of the foregoing two locating points, and 2. a maximum value of a time interval between locating points in the hot area is greater than a preset time threshold; and after determining the hot area that meets the conditions, determines a geometric center point of the hot area as a stay point that represents the hot area, and forms several stay points so as to obtain a diagram of tracks of stay points shown in FIG. 2-b, where each black point in FIG. 2-b represents a formed stay point, each stay point can represent a large quantity of locating points generated when a user stays at a same place. It can be learned after FIG. 2-*b* is compared with FIG. 2-*a* that, most layover points, locating jump points, and pass-through points are filtered out in FIG. 2-*b*.

Step 2: The clustering apparatus for a point of interest calculates a confidence level of each stay point according to movement states (such as stationary, walking, and riding) of the user at all locating points that form one stay point, where if an average speed corresponding to movement states of the user at all locating points of one stay point is lower, a confidence level of the stay point is higher, for example, if a percentage of locating points, of a stay point, whose movement states are stationary (that is, a movement speed is 0) in all locating points that form the stay point is higher, a confidence level of the stay point is higher; otherwise, if a percentage of locating points, of a stay point, whose movement states are riding (that is, a movement speed is far greater than 0) in all locating points that form the stay point is higher, a confidence level of the stay point is lower; and after calculating the confidence level of each stay point, removes, from the stay point set shown in FIG. 2-*b*, a stay point whose confidence level is not greater than a preset confidence level threshold, that is, obtains, from the stay point set shown in FIG. 2-*b* by means of screening, a stay point whose confidence level is greater than the preset confidence level threshold, so as to obtain a set of trusted stay points that is shown in FIG. 2-*c*. It can be learned after FIG. 2-*c* is compared with FIG. 2-*b* that, some on-the-way noise stay points (pseudo stay points corresponding to a traffic-jammed section, waiting for a traffic light, and slowly walking) are filtered out in FIG. 2-*c*.

Step 3: Cluster the foregoing stay points based on confidence levels, identify a maximum stay point set in which all stay points are density-connected (that is, any two stay points in the set are density-connected), and cluster residence points in the maximum stay point set to form a POI, where an area of the POI may be represented by using a closed polygon that is formed by sequentially connecting all leaf stay points in the maximum stay point set, such as a schematic diagram of a POI that is obtained by means of clustering and is shown in FIG. 2-*d*. A confidence level of each stay point is considered in a clustering process in step 3, so that clustering reliability of a POI can be improved, and an area range of the POI is closer to an area range in a real case.

An embodiment of the present disclosure further provides a clustering apparatus for a point of interest. As shown in FIG. 3, a clustering apparatus for a point of interest 300 in this embodiment of the present disclosure includes an acquiring unit 301, a stay point generating unit 302, a calculating unit 303, a filtering unit 304, and a clustering unit 305, where:

The acquiring unit 301 is configured to acquire a locating point set of a user within a preset period.

The locating point set in this embodiment of the present disclosure includes one or more locating points, and the locating point is used to indicate location information of the user.

Optionally, the locating point is a GPS location point represented by a longitude value and a latitude value, and the clustering apparatus for a point of interest acquires the locating point set of the user within the preset period from GPS location data of the user.

The stay point generating unit 302 is configured to generate a stay point set according to the locating point set acquired by the acquiring unit 301, where each stay point in the foregoing stay point set represents one hot area, and the foregoing hot area meets the following conditions: a distance between geographic locations of any two locating points in the foregoing hot area is less than a higher locating precision in locating precisions of the foregoing two locating points, and a maximum value of a time interval between locating points in the foregoing hot area is greater than a preset time threshold.

Figure 4:
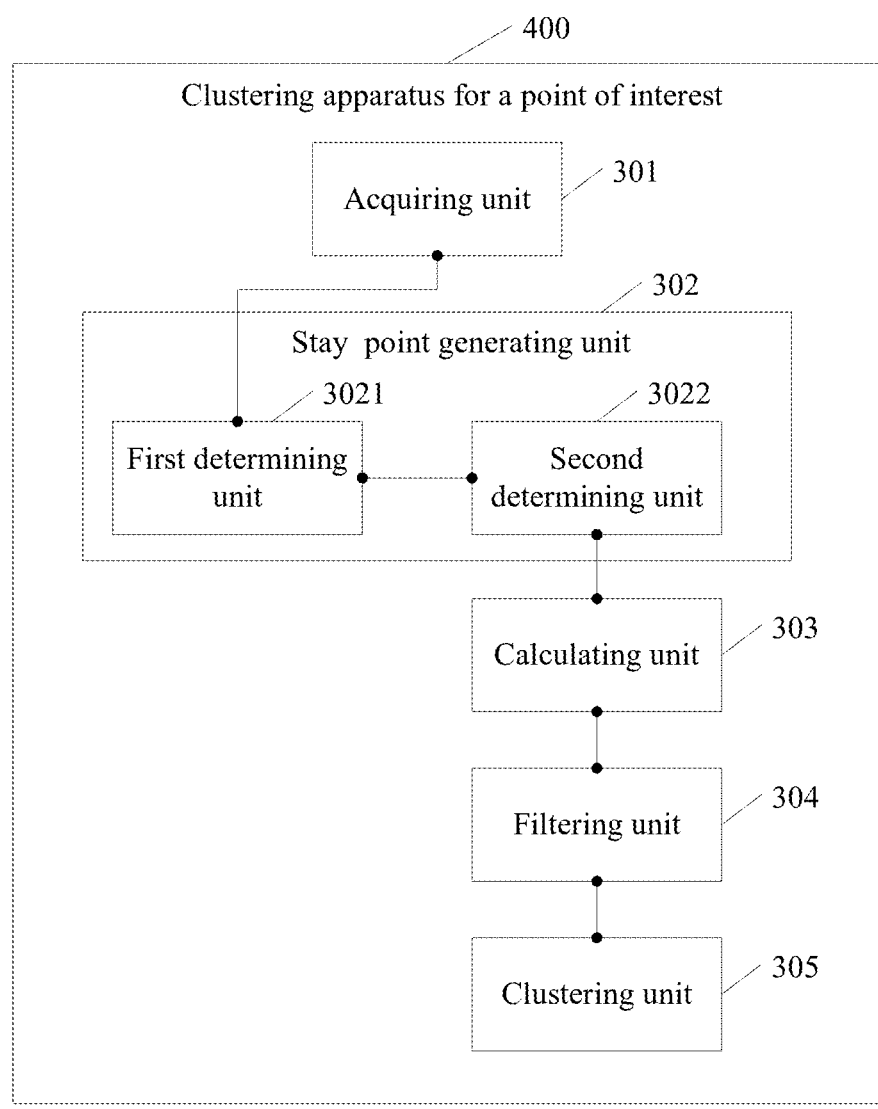
FIG. 4 is a schematic structural diagram of another embodiment of a clustering apparatus for a point of interest according to the present disclosure.

Optionally, on the basis of the embodiment shown in FIG. 3, according to a clustering apparatus for a point of interest 400 shown in FIG. 4, the stay point generating unit 302 includes: a first determining unit 3021, configured to determine a hot area that meets the foregoing conditions; and a second determining unit 3022, configured to determine a geometric center point of the foregoing hot area as a stay point that represents the foregoing hot area.

The calculating unit 303 is configured to calculate a confidence level of each stay point in the foregoing stay point set, where a lower average speed corresponding to movement states of all locating points in a hot area represented by a stay point indicates a higher confidence level of the stay point.

Optionally, on the basis of the embodiment shown in FIG. 3 or FIG. 4, the calculating unit 303 includes: an acquiring subunit, configured to acquire movement states of all locating points included in a hot area represented by each stay point; and a calculating subunit, configured to calculate the confidence level of each stay point in the foregoing stay point set by using a formula $$Conf_i = \left(\sum_{k=1}^{n} W_k \cdot n_k\right) \bigg/ \sum_{k=1}^{n} n_k$$

and according to the movement states that are of all locating points included in the hot area represented by each stay point and are acquired by the foregoing acquiring subunit, where $Conf_i$ represents a confidence level of a stay point i, n represents n possible movement states, $W_k$ represents a confidence level weight of the $k^{th}$ movement state, and $n_k$ represents a quantity of locating points that are in a hot area represented by the stay point i and whose movement states are the $k^{th}$ movement state, where each movement state is corresponding to a confidence level weight, and a lower movement speed corresponding to a movement state indicates a larger confidence level weight of the movement state.

Optionally, the foregoing acquiring subunit is configured to acquire the movement states of all locating points included in the hot area represented by each residence point according to sensor data (such as an acceleration and data acquired from a gyroscope) on a terminal of the foregoing user or a change of signal strength and a change of a signal quantity of a Wi-Fi network.

The filtering unit 304 is configured to obtain a trusted stay point from the foregoing stay point set by means of screening according to the confidence level that is of each stay point in the foregoing stay point set and is calculated by the calculating unit 303, where a confidence level of the foregoing trusted stay point is greater than a preset confidence level threshold.

The clustering unit 305 is configured to cluster density-connected trusted stay points to form a point of interest, where the "density-connected" indicates that ranges of hot areas represented by two trusted stay points are directly connected or indirectly connected each other.

Optionally, the clustering unit 305 is further configured to cluster all density-connected trusted stay points to form a point of interest, and determine that a closed area that is formed by sequentially connecting all leaf stay points among all density-connected trusted stay points as an area of a point of interest, where a sum of confidence levels of all stay points within a preset radius coverage range whose center is a leaf stay point is not greater than a preset threshold.

It should be noted that the clustering apparatus for a point of interest in this embodiment of the present disclosure may be a terminal (such as a mobile phone, a tablet, a notebook computer, a desktop computer, or another terminal that has a locating function), or the clustering apparatus for a point of interest may be an apparatus that is independent of a terminal and can communicate with the terminal in a wired or wireless manner, which is not limited herein.

It should be noted that the clustering apparatus for a point of interest in this embodiment of the present disclosure may be a clustering apparatus for a point of interest in the foregoing method embodiment, and can be configured to implement all technical solutions in the foregoing method embodiment. A function of each function module of the clustering apparatus for a point of interest may be implemented according to a method described in the foregoing method embodiment. For a specific implementation process, reference may be made to related descriptions in the foregoing embodiment, and details are not described herein again.

It can be learned from the foregoing that, in this embodiment of the present disclosure, one stay point is formed by multiple locating points according to a locating precision and a time threshold, and most layover points, locating jump points, and pass-through points can be filtered out under the constraint of the locating precision and the time threshold. In addition, a confidence level of a stay point is calculated with reference to movement states of locating points of the stay point, and a stay point whose confidence level is relatively low is screened out according to the confidence level of the stay point, so that some on-the-way noise stay points (such as pseudo stay points generated at the time of staying in a traffic-jammed section, waiting for a traffic light, and slowly walking) can further be filtered out. Therefore, a point of interest that is finally formed by clustering density-connected trusted stay points has higher reliability and higher reference value.

An embodiment of the present disclosure further provides a computer storage medium, where the computer storage medium stores a program, and the program performs a part or all of steps recorded in the foregoing method embodiment.

Figure 5:
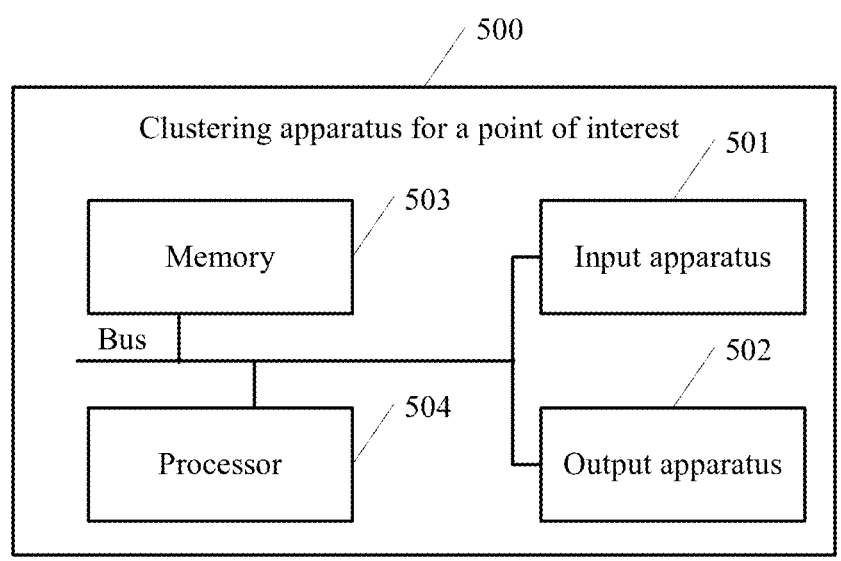
FIG. 5 is a schematic structural diagram of still another embodiment of a clustering apparatus for a point of interest according to the present disclosure.

The following describes another clustering apparatus for a point of interest that is provided in this embodiment of the present disclosure. Referring to FIG. 5, a clustering apparatus for a point of interest 500 in this embodiment of the present disclosure includes: an input apparatus 501, an output apparatus 502, a memory 503, and a processor 504 (there may be one or more processors 504 in the clustering apparatus for a point of interest 500, and one processor is used as an example in FIG. 5). In some embodiments of the present disclosure, the input apparatus 501, the output apparatus 502, the memory 503, and the processor 504 may be connected by using a bus or in another manner. In FIG. 5, a bus connection is used as an example. The memory 503 is configured to store data that is input by the input apparatus 501, and may further store information, such as a necessary file, for data processing by the processor 504. Both the input apparatus 501 and the output apparatus 502 may include a port that is used by the clustering apparatus for a point of interest 500 to communicate with another device, and may further include external output devices connected to the clustering apparatus for a point of interest 500, such as a display, a keyboard, a mouse, and a printer. The input apparatus 501 may include a mouse, a keyboard, and the like, and the output apparatus 502 may include a display and the like. In this embodiment of the present disclosure, the port that is in both the input apparatus 501 and the output apparatus 502 and is for communicating with the another device is an antenna and/or a communications cable.

The processor 504 performs the following steps: acquiring a locating point set of a user within a preset period; generating a stay point set according to the foregoing locating point set, where each stay point in the foregoing stay point set represents one hot area, and the foregoing hot area meets the following conditions: a distance between geographic locations of any two locating points in the foregoing hot area is less than a higher locating precision in locating precisions of the foregoing two locating points, and a maximum value of a time interval between locating points in the foregoing hot area is greater than a preset time threshold; calculating a confidence level of each stay point in the foregoing stay point set, where a lower average speed corresponding to movement states of all locating points in a hot area represented by a stay point indicates a higher confidence level of the stay point; obtaining a trusted stay point from the foregoing stay point set by means of screening according to the confidence level of each stay point in the foregoing stay point set, where a confidence level of the foregoing trusted stay point is greater than a preset confidence level threshold; and clustering density-connected trusted stay points to form a point of interest, where the foregoing "density-connected" indicates that ranges of hot areas represented by two trusted stay points are directly connected or indirectly connected each other.

Optionally, the locating point is a GPS location point represented by a longitude value and a latitude value, and the processor 504 is configured to acquire the locating point set of the user within the preset period from GPS location data of the user.

Optionally, after determining a hot area that meets the foregoing conditions, the processor 504 determines a geometric center point of the foregoing hot area as a stay point that represents the foregoing hot area, where the stay point may represent all locating points in the hot area. Certainly, another manner may also be used to determine a stay point corresponding to a hot area. For example, a center of gravity of a hot area is used as a stay point that represents the hot area, where the center of gravity of the hot area is related to a distribution of locating points within the hot area.

Optionally, the processor 504 acquires movement states of all locating points included in a hot area represented by each stay point in the foregoing stay point set; and calculates the confidence level of each stay point in the foregoing stay point set according to the movement states of all locating points included in the hot area represented by each stay point in the foregoing stay point set and by using a formula $$Conf_i = \left(\sum_{k=1}^{n} W_k \cdot n_k\right) / \sum_{k=1}^{n} n_k,$$

where $Conf_i$ represents a confidence level of a stay point i, n represents n possible movement states, $W_k$ represents a confidence level weight of the $k^{th}$ movement state, and $n_k$ represents a quantity of locating points that are in a hot area represented by the stay point i and whose movement states are the $k^{th}$ movement state, where each movement state is corresponding to a confidence level weight, and a lower movement speed corresponding to a movement state indicates a larger confidence level weight of the movement state. For example, it is assumed that a possible movement state of the user is stationary, walking, or riding, and then for the three movement states, because movement speeds that are corresponding to the movement states and are in ascending order are sequentially as follows: stationary, walking, and riding, confidence level weights that are of the movement states and are in descending order are sequentially as follows: stationary, walking, and riding.

Optionally, the processor 504 acquires the movement states of all locating points in the foregoing locating point set according to sensor data (such as an acceleration and data acquired from a gyroscope) on a terminal of the foregoing user or a change of signal strength and a change of signal quantity of a Wi-Fi network; or the processor 504 may acquire the movement states of all locating points included in the hot area represented by each residence point from another locating device (such as a server), which is not limited herein.

Optionally, the processor 504 clusters all density-connected trusted stay points to form a POI, and determines that a closed area that is formed by sequentially connecting all leaf stay points among all the density-connected trusted stay points is an area of the POI, or an area of the POI may be a minimum circular area or square area that includes all the density-connected trusted stay points, which is not limited herein.

It should be noted that the clustering apparatus for a point of interest in this embodiment of the present disclosure may be a terminal (such as a mobile phone, a tablet, a notebook computer, a desktop computer, or another terminal that has a locating function), or the clustering apparatus for a point of interest may be an apparatus that is independent of a terminal and can communicate with the terminal in a wired or wireless manner, which is not limited herein.

It should be noted that the clustering apparatus for a point of interest in this embodiment of the present disclosure may be a clustering apparatus for a point of interest in the foregoing method embodiment, and may be configured to implement all technical solutions in the foregoing method embodiment. Functions of each function module of the clustering apparatus for a point of interest may be implemented according to a method described in the foregoing method embodiment. For a specific implementation process, reference may be made to related descriptions in the foregoing embodiment, and details are not described herein again.

It can be learned from the foregoing that, in this embodiment of the present disclosure, one stay point is formed by multiple locating points according to a locating precision and a time threshold, and most layover points, locating jump points, and pass-through points can be filtered out under the constraint of the locating precision and the time threshold. In addition, a confidence level of a stay point is calculated with reference to movement states of locating points of the stay point, and a stay point whose confidence level is relatively low is screened out according to the confidence level of the stay point, so that some on-the-way noise stay points (such as pseudo stay points generated at the time of staying in a traffic-jammed section, waiting for a traffic light, and slowly walking) can further be filtered out. Therefore, a point of interest that is finally formed by clustering density-connected trusted stay points has higher reliability and higher reference value.

It should be noted that, for brief description, the foregoing method embodiments are represented as a series of actions. However, a person skilled in the art should appreciate that the present disclosure is not limited to the described order of the actions, because according to the present disclosure, some steps may be performed in other orders or simultaneously. In the foregoing embodiments, the description of each embodiment has respective focuses. For a part that is not described in detail in an embodiment, reference may be made to related descriptions in other embodiments.

In the several embodiments provided in the present application, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing describes in detail a clustering method for a point of interest and a related apparatus that are provided in the present disclosure. A person of ordinary skill in the art may, based on the idea of the present disclosure, make modifications with respect to the specific implementation manners and the application scope. Therefore, the content of this specification shall not be construed as a limitation to the present disclosure.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A clustering method, comprising:
   acquiring, from a location tracking device, a locating point set of a user within a preset period, wherein each locating point in the locating point set indicates a particular location of the user at a particular time;
   generating a stay point set according to the locating point set, wherein each stay point in the stay point set represents a hot area, and the hot area meets a set of conditions, the set of conditions comprising: a distance between geographic locations of any two locating points in the hot area is less than a higher locating precision in locating precisions of the two locating points, and a maximum value of a time interval between locating points in the hot area is greater than a preset time threshold;
   acquiring movement states of locating points comprised in a hot area represented by each stay point;
   calculating a confidence level of each stay point in the stay point set according to the movement states of the locating points comprised in the hot area represented by each stay point and according to a relation between confidence level weights of movement states of each stay point in the stay point set and a quantity of locating points that are located in the hot area represented by a corresponding stay point and whose movement state correspond to a corresponding movement state, wherein each movement state corresponds to a confidence level weight, wherein a lower average speed corresponding to the movement states of the locating points in a hot area represented by a stay point indicates a higher confidence level of the stay point, and wherein a lower movement speed corresponding to a movement state indicates a larger confidence level weight of the movement state;
   obtaining a trusted stay point from the stay point set by screening according to the confidence level of each stay point in the stay point set, wherein a confidence level of the trusted stay point is greater than a preset confidence level threshold; and
   clustering density-connected trusted stay points to form a point of interest, wherein the density-connected trusted stay points are trusted stay points that represent hot areas whose ranges are connected to each other.

2. The method according to claim 1, wherein generating the stay point set according to the locating point set comprises:
   determining a hot area that meets the set of conditions; and
   determining a geometric center point of the hot area as a stay point that represents the hot area.

3. The method according to claim 1, wherein calculating the confidence level of each stay point in the stay point set comprises:
   calculating the confidence level of each stay point in the stay point set according to a relation $$Conf_i = \left(\sum_{k=1}^{n} W_k \cdot n_k\right) / \sum_{k=1}^{n} n_k$$

wherein $Conf_i$ represents a confidence level of a stay point i, n represents n possible movement states, $W_k$ represents a confidence level weight of a kth movement state, and $n_k$ represents a quantity of locating points that are in a hot area represented by the stay point i and whose movement states are the kth movement state.

4. The method according to claim 3, wherein acquiring the movement states of the locating points comprised in the hot area represented by each stay point comprises:
   acquiring the movement states of the locating points comprised in the hot area represented by each stay point according to sensor data on a terminal of the user.

5. The method according to claim 3, wherein acquiring the movement states of the locating points comprised in the hot area represented by each stay point comprises acquiring the movement states of the locating points comprised in the hot area represented by each stay point according to a change of signal strength and a change of a signal quantity of a Wi-Fi network.

6. The method according to claim 1, wherein clustering the density-connected trusted stay points to form the point of interest comprises:
   determining a closed area that is formed by connecting all leaf stay points among all density-connected trusted stay points as an area of a point of interest, wherein a sum of confidence levels of all stay points within a preset radius coverage range whose center is a leaf stay point is not greater than a preset threshold.

7. The method according to claim 1, wherein the density-connected trusted stay points are trusted stay points that represent hot areas whose ranges are directly connected to each other.

8. The method according to claim 1, wherein the density-connected trusted stay points are trusted stay points that represent hot areas whose ranges are indirectly connected to each other.

9. A clustering apparatus, comprising:
   a memory configured to store instructions; and
   a processor coupled to the memory and configured to execute the instructions to:
      acquire, from a location tracking device, a locating point set of a user within a preset period, wherein each locating point in the locating point set indicates a particular location of the user at a particular time;
      generate a stay point set according to the locating point set, wherein each stay point in the stay point set represents a hot area, and the hot area meets a set of conditions, the set of conditions comprising: a distance between geographic locations of any two locating points in the hot area is less than a higher locating precision in locating precisions of the two locating points, and a maximum value of a time interval between locating points in the hot area is greater than a preset time threshold;
      acquire movement states of locating points comprised in a hot area represented by each stay point;
      calculate a confidence level of each stay point in the stay point set according to the movement states that are of the locating points comprised in the hot area represented by each stay point and according to a relation between confidence level weights of movement states of each stay point in the stay point set and a quantity of locating points that are located in the hot area represented by a corresponding stay point and whose movement state correspond to a corresponding movement state, wherein each movement state corresponds to a confidence level weight, wherein a lower average speed corresponding to the movement states of the locating points in a hot area represented by a stay point indicates a higher confidence level of the stay point, and wherein a lower movement speed corresponding to a movement state indicates a larger confidence level weight of the movement state;

obtain a trusted stay point from the stay point set by means of screening according to the confidence level that is of each stay point in the stay point set, wherein a confidence level of the trusted stay point is greater than a preset confidence level threshold; and cluster density-connected trusted stay points to form a point of interest, wherein the density-connected trusted stay points are trusted stay points that represent hot areas whose ranges are connected to each other.

10. The clustering apparatus according to claim 9, wherein the processor is further configured to execute the instructions to:

determine a hot area that meets the set of conditions; and determine a geometric center point of the hot area as a stay point that represents the hot area.

11. The clustering apparatus according to claim 9, wherein the processor is further configured to execute the instructions to:

calculate the confidence level of each stay point in the stay point set according to a relation $$Conf_i = \left(\sum_{k=1}^{n} W_k \cdot n_k\right) \bigg/ \sum_{k=1}^{n} n_k$$

wherein $Conf_i$ represents a confidence level of a stay point i, n represents n possible movement states, $W_k$ represents a confidence level weight of a kth movement state, and $n_k$ represents a quantity of locating points that are in a hot area represented by the stay point i and whose movement states are the kth movement state.

12. The clustering apparatus according to claim 11, wherein the processor is further configured to execute the instructions to acquire the movement states of the locating points comprised in the hot area represented by each residence point according to sensor data on a terminal of the user.

13. The clustering apparatus according to claim 11, wherein the processor is further configured to execute the instructions to acquire the movement states of the locating points comprised in the hot area represented by each residence point according to a change of signal strength and a change of a signal quantity of a Wi-Fi network.

14. The clustering apparatus according to claim 9, wherein the processor is further configured to execute the instructions to cluster all density-connected trusted stay points to form a point of interest, and determine a closed area that is formed by connecting all leaf stay points among all density-connected trusted stay points as an area of a point of interest, wherein a sum of confidence levels of all stay points within a preset radius coverage range whose center is a leaf stay point is not greater than a preset threshold.

15. The clustering apparatus according to claim 9, wherein the density-connected trusted stay points are trusted stay points that represent hot areas whose ranges are directly connected to each other.

16. The clustering apparatus according to claim 9, wherein the density-connected trusted stay points are trusted stay points that represent hot areas whose ranges are indirectly connected to each other.

17. A clustering apparatus, comprising:

means for acquiring, from a location tracking device, a locating point set of a user within a preset period, wherein each locating point in the locating point set indicates a particular location of the user at a particular time;

means for generating a stay point set according to the locating point set, wherein each stay point in the stay point set represents a hot area, and the hot area meets a set of conditions, the set of conditions comprising: a distance between geographic locations of any two locating points in the hot area is less than a higher locating precision in locating precisions of the two locating points, and a maximum value of a time interval between locating points in the hot area is greater than a preset time threshold;

means for acquiring movement states of locating points comprised in a hot area represented by each stay point;

means for calculating a confidence level of each stay point in the stay point set according to the movement states of the locating points comprised in the hot area represented by each stay point and according to a relation between confidence level weights of movement states of each stay point in the stay point set and a quantity of locating points that are located in the hot area represented by a corresponding stay point and whose movement state correspond to a corresponding movement state, wherein each movement state corresponds to a confidence level weight, wherein a lower average speed corresponding to the movement states of the locating points in a hot area represented by a stay point indicates a higher confidence level of the stay point, and wherein a lower movement speed corresponding to a movement state indicates a larger confidence level weight of the movement state;

means for obtaining a trusted stay point from the stay point set by means of screening according to the confidence level of each stay point in the stay point set, wherein a confidence level of the trusted stay point is greater than a preset confidence level threshold; and means for clustering density-connected trusted stay points to form a point of interest, wherein the density-connected trusted stay points are trusted stay points that represent hot areas whose ranges are connected to each other.

18. The apparatus according to claim 17, wherein the means for generating the stay point set is configured to determine a hot area that meets the set of conditions and to determine a geometric center point of the hot area as a stay point that represents the hot area.

19. The apparatus according to claim 17, wherein the means for calculating is configured to:

calculate the confidence level of each stay point in the stay point set according to a relation $$Conf_i = \left(\sum_{k=1}^{n} W_k \cdot n_k\right) \bigg/ \sum_{k=1}^{n} n_k$$

wherein $Conf_i$ represents a confidence level of a stay point i, n represents n possible movement states, $W_k$ represents a confidence level weight of a kth movement state, and $n_k$ represents a quantity of locating points that are in a hot area represented by the stay point i and whose movement states are the kth movement state.

20. The apparatus according to claim 17, wherein the means for clustering is configured to:
   determine a closed area that is formed by connecting all leaf stay points among all density-connected trusted stay points as an area of a point of interest, wherein a sum of confidence levels of all stay points within a preset radius coverage range whose center is a leaf stay point is not greater than a preset threshold.

* * * * *